United States Patent [19]

Toyama et al.

[11] Patent Number: 4,560,115
[45] Date of Patent: Dec. 24, 1985

[54] EMERGENCY LOCK SAFETY BELT RETRACTOR WITH LOCK-UP RELEASE MECHANISM

[75] Inventors: Hiroshige Toyama, Shizuoka; Yoshiyuki Mizuno, Kosai; Yoshimi Yamamoto, Shizuoka; Mitsuru Kato, Toyohashi, all of Japan

[73] Assignee: Fuji Kiko Company, Limited, Tokyo, Japan

[21] Appl. No.: 593,843

[22] Filed: Mar. 27, 1984

[30] Foreign Application Priority Data

Mar. 30, 1983 [JP] Japan .............................. 58-46354[U]

[51] Int. Cl.$^4$ ....................... A62B 35/02; B65H 75/48
[52] U.S. Cl. ......................... 242/107.4 A; 242/107.4 B
[58] Field of Search ................. 242/107.4 A, 107.4 B; 280/806; 297/478, 480

[56] References Cited

U.S. PATENT DOCUMENTS

| | | | |
|---|---|---|---|
| 4,186,895 | 2/1980 | Burghardt et al. | 242/107.4 B |
| 4,278,216 | 7/1981 | Takada | 242/107.4 B X |
| 4,393,995 | 7/1983 | Tukamoto | 242/107.4 B X |

Primary Examiner—John M. Jillions
Attorney, Agent, or Firm—Schwartz, Jeffery, Schwaab, Mack, Blumenthal & Evans

[57] ABSTRACT

An emergency lock safety belt retractor is designed to facilitate release from an inadvertent lock-up which may occur after full-speed retraction of the seat belt. This undesired lock-up is due to a latch mechanism which locks a belt spool in response to either excessively abrupt onset of extraction, such as may occur in front-end automotive accidents, or excessively abrupt cessation of retraction. This latch mechanism has two separate latches: a simple latch pawl biased away from its latched position and a more complicated lock wheel. The latch pawl is mounted on a rotary drum and in its latched position engages teeth on a stationary drum. The lock wheel is coupled for rotation with the belt spool but is free to move axially through three regimes. The lock wheel is biased toward a first axial regime in which it couples the rotary drum to the belt spool. In the second regime, it couples the belt spool to both the rotary drum and a set of stationary latch teeth, thus locking the belt spool and the rotary drum against rotation in the direction of extraction of the belt. In the third regime, the belt spool and latch teeth remain coupled while the rotary drum is released. The coupling between the lock wheel and the belt spool causes the lock wheel to move from the first to the second to the third regime as the belt is extracted slightly after the latch pawl is engaged.

27 Claims, 10 Drawing Figures

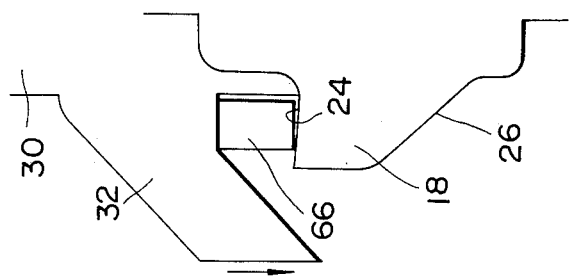
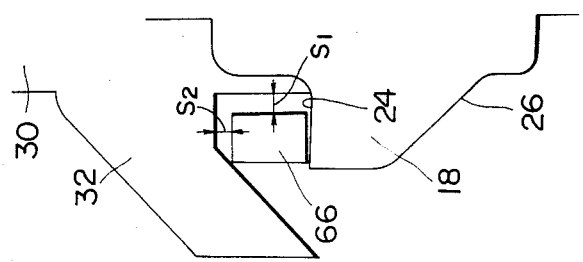
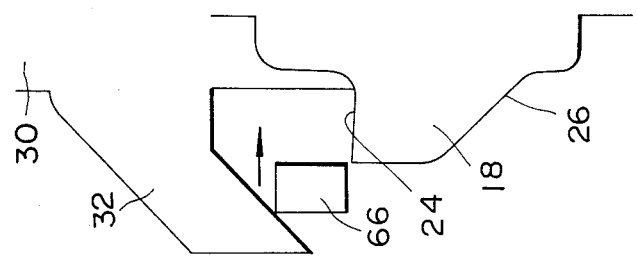
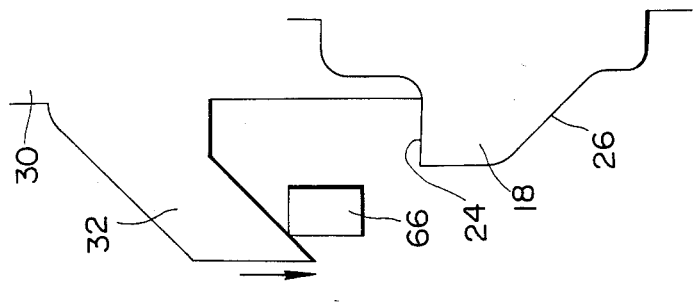

EMERGENCY LOCK SAFETY BELT RETRACTOR WITH LOCK-UP RELEASE MECHANISM

BACKGROUND OF THE INVENTION

The present invention relates generally to an emergency-lock-type safety or seat belt retractor for an automotive vehicle, which includes a mechanism facilitating release of the lock-up condition of the retractor. More specifically, the invention relates to an emergency lock safety belt retractor having a lock-up release mechanism which can release the retractor even when the webbing is fully retracted.

In general, an emergency-lock-type safety belt retractor is provided with a sensor which detects abnormally abrupt deceleration of the vehicle to lock a belt spool about which a webbing is wound, and a second sensor which detects abnormally abrupt movement of the webbing out of the belt spool. The locking action mediated by the second sensor can normally be released by retracting the webbing slightly. The sensor detecting abrupt vehicle deceleration will be hereafter referred to as "vehicle sensor". On the other hand, the sensor detecting abrupt movement of the webbing will be hereafter referred to as "webbing sensor".

The webbing sensor may lock the retractor after the webbing is fully retracted on the spool due to a characteristic abrupt deceleration at the end of the retraction stroke. This state in which the retractor becomes locked after full retraction of the webbing will be hereafter referred to as "lock-up state". If the retractor falls into lock-up state after the belt has been fully retracted, releasing the retractor from the lock-up state is problematic as there is no leeway for further retraction.

SUMMARY OF THE INVENTION

Therefore, it is an object of the present invention to provide an emergency lock safety belt retractor with a lock-up release mechanism which allows release of the retractor from the lock-up state even when the belt is fully retracted.

Another and more specific object of the invention is to provide an emergency-lock-type safety belt retractor having a lock-up release mechanism which releases inadvertent lock-up stage of the retractor in response to extraction of a webbing.

A further object of the invention is to provide an emergency-lock-type safety belt retractor with a lock-up release mechanism which requires only a very short stroke of belt movement in either direction to release the retractor so that it facilitates release of the retractor from lock-up state even when the webbing has been fully retracted.

In order to accomplish the above-mentioned and other objects, an emergency lock safety belt retractor, according to the present invention, comprises a lock mechanism for locking rotational movement when an vehicle sensor detects a predetermined deceleration of the vehicle or when a webbing sensor detects abrupt change in belt speed. The lock mechanism is movable along the axis of the belt spool and rotatable about the spool axis. The lock mechanism is adapted to be released from locking state when the belt spool is rotated in the direction of rolling in or retraction of the webbing. In the locked state, the lock mechanism allows the webbing to be extracted through a given stroke by its movement in the same direction as that causing locking. The webbing sensor is adapted to disengage from the locking mechanism in response to the webbing stroke in the extraction direction in the locking state of the locking mechanism, so that it may move independently of the locking mechanism. The movement allowed by the webbing sensor allows the retractor to be released from the lock-up state.

In addition, as the extracted stroke of the webbing can be subsequently retracted, the lock mechanism can be released from the locking state by belt spool rotation in the direction of retraction of the belt.

According to one aspect of the invention, an emergency lock type safety belt retractor comprises a belt spool wound therearound with a webbing, a first locking member rotatable with the belt spool, a second locking member normally engageable to the first locking member for rotation with the belt spool, the second locking member movable both in rotational and axial direction, a third locking member associated with the second locking member for causing the latter to move in axial direction, the third locking member rotatable with rotation of the belt spool in normal state, a fourth locking member fixed to a retractor housing and having locking teeth, a first sensor detecting an inertia exceeding a given magnitude to move from a normal state to a locking state, the first sensor including a first pawl engageable to the third locking member for establishing first locking engagement to restrict rotational movement of the third member to cause rotational and axial movement of the second locking member toward the first locking member for establishing a second locking engagement with the fourth locking member for restricting rotation of the belt spool, a second sensor detecting rotating speed of the belt spool to establish a third locking engagement between a second pawl incorporated therein and the third locking member for establishing the second locking engagement between the second locking member and the fourth locking member for restricting rotation of the belt spool, and means for allowing the belt spool to rotate in rolling out direction corresponding to a given webbing rolling out stroke after once the second locking engagement being established, in order to disengage the first and third locking engagement so as to release the second locking engagement by subsequent belt spool rotation in rolling in direction.

According to another aspect of the invention, an emergency lock safety belt retractor for an automobile vehicle comprises a belt spool received within a retractor housing and wound therearound with a webbing, the belt spool being rotatable in a first direction for rolling out the webbing from the belt spool and in a second direction for retracting the webbing to the belt spool, a first locking member fixedly secured to the belt spool for rotation therewith, the first locking member including a locking claw means extending perpendicular to a plane transverse to a longitudinal axis of the belt spool and oblique to the belt spool longitudinal axis, a second locking member associated with the first locking member for rotation therewith and movable in rotational and axial direction, a third locking member associated with the second locking member and operative between a first position in which it is rotatable with the second locking member according to rotation of the belt spool either in the first direction or in the second direction, and a second position in which it is restricted from rotation, in the second position, the third locking member actuating the second locking member to cause helical movement of the latter, a fourth locking member fixed to the retractor housing and opposing to the second locking member, a first sensor responsive to deceleration exceeding a given magnitude to move from normal state to a locking state, the first sensor including a first pawl engageable to the third locking member for establishing first locking engagement to restrict rotational movement of the third member to cause helical movement of the second locking member in response to subsequent rotation of the belt spool in the first direction toward the first locking member for establishing a second locking engagement with the fourth locking member for restricting rotation of the belt spool, a second sensor detecting rotating speed of the belt spool to establish a third locking engagement between a second pawl incorporated therein and the third locking member to cause helical movement of the second locking member in response to subsequent rotation of the belt spool in the first direction for establishing the second locking engagement between the second locking member and the fourth locking member for restricting rotation of the belt spool, and means for allowing the belt spool to rotate in rolling out direction corresponding to a given webbing rolling out stroke after once the second locking engagement being established, in order to disengage the first and third locking engagement so as to release the second locking engagement by subsequent belt spool rotation in rolling in direction.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only:

In the drawings:

FIGS. 7 to 10 are diagrams of the operation of the lock-up release according to the present invention.

DESCRIPTION OF THE PREFERRED EMBODIMENT

Figure 1:
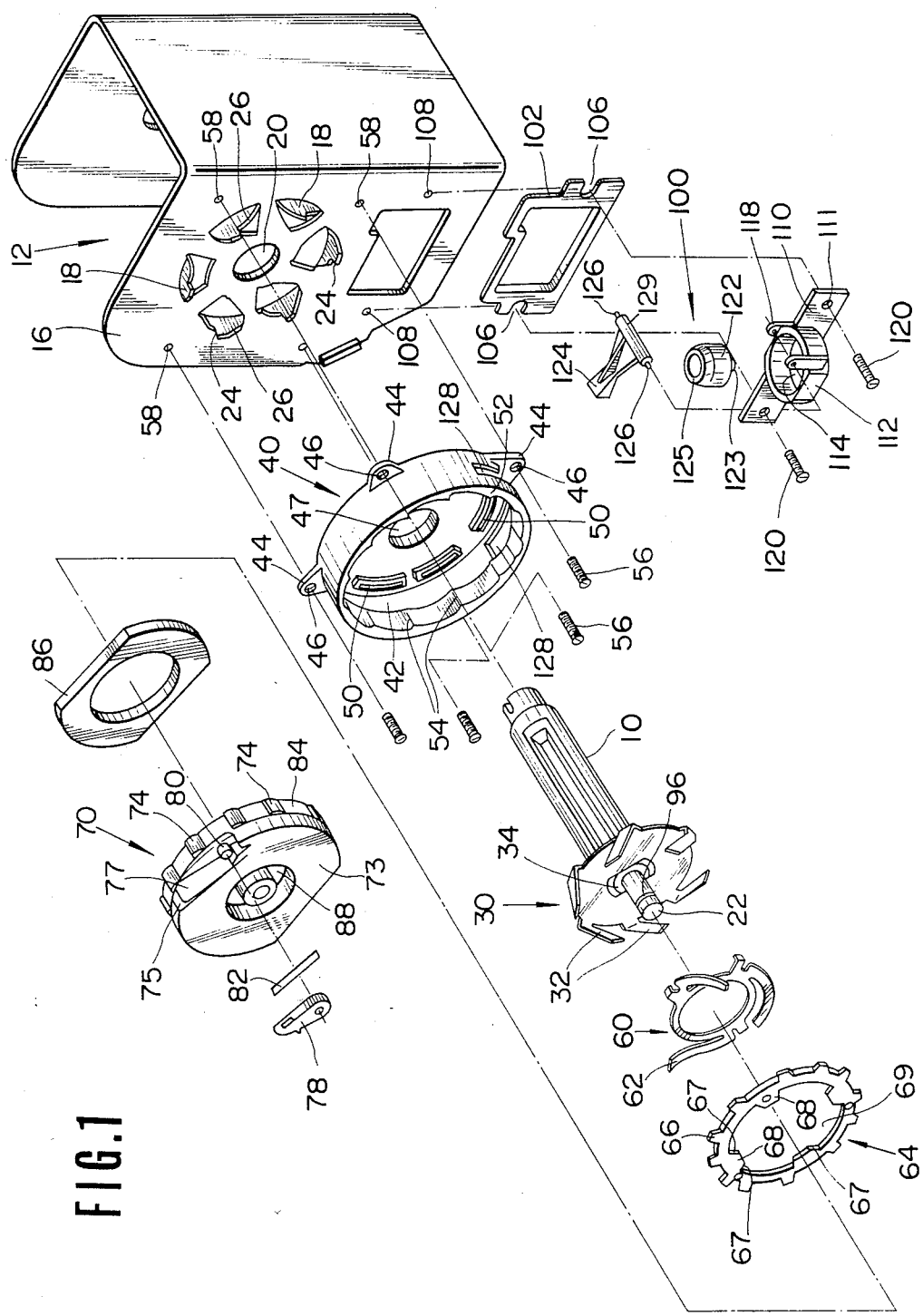
FIG. 1 is an exploded perspective view of the preferred embodiment of an emergency lock type safety belt retractor according to the present invention.
Figure 2:
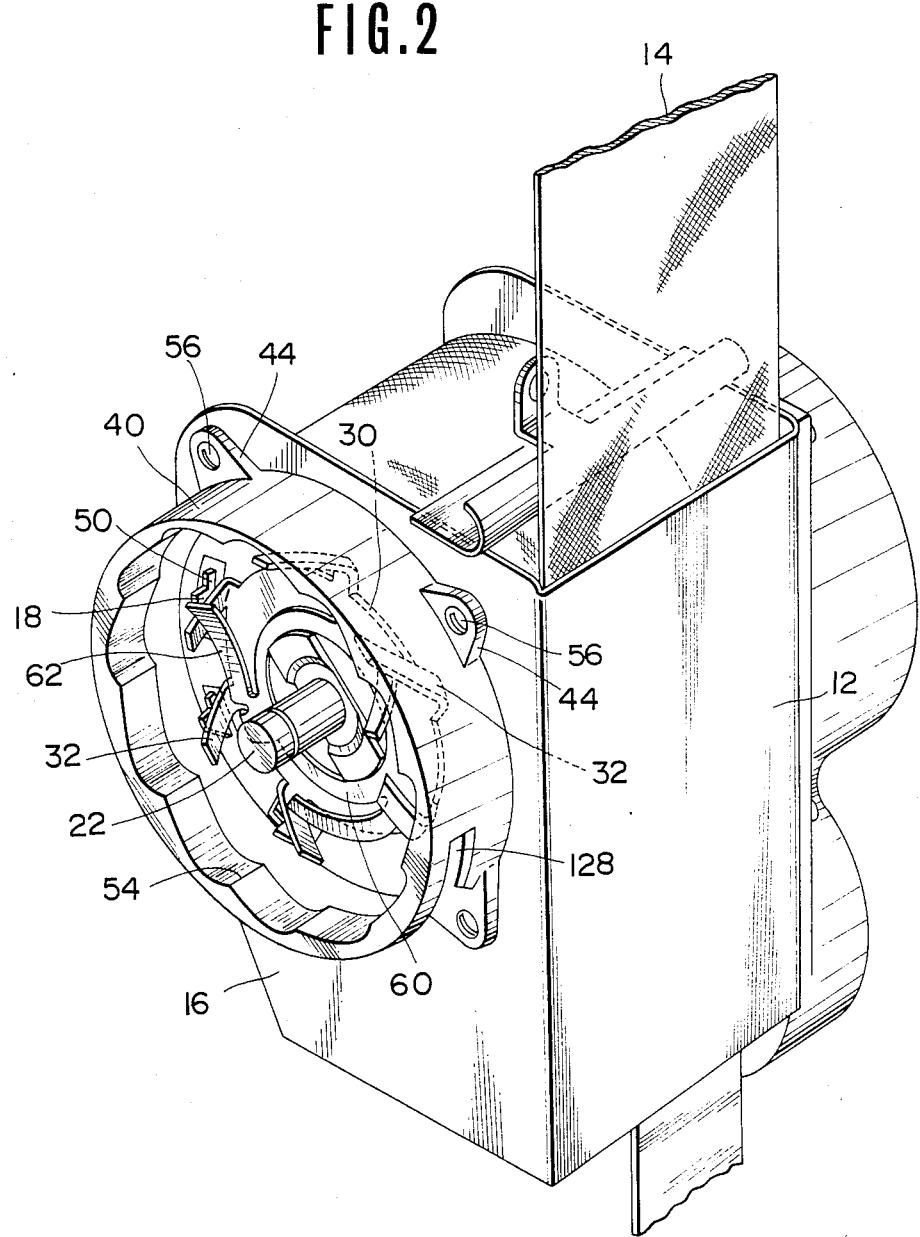
FIG. 2 is a perspective view of the safety belt retractor as assembled in which some components have been removed for clarity.

Referring now to the drawings, particularly to FIG. 1, a belt spool 10 is rotatably received in a retractor housing 12. A webbing 14 is wound around the belt spool 10 so that it can be extracted and retracted. Although not clearly shown, the belt spool 10 is normally biased to retract the webbing 14 by means of a per se well known resilient biasing means. The retractor housing 12 has a side wall 16 from which a plurality of latching teeth 18 protrude laterally with respect to the outer surface thereof. The latching teeth are arranged symmetrically around the edge of a circular opening 20 through which one end 22 of the belt spool 10 extends. As clearly shown in FIGS. 7 to 10, each of the latching teeth 18 is in the form of a ratchet tooth having one edge 24 essentially perpendicular to the outer surface of the side wall 16 and the other edge 26 inclined relative to the outer surface.

Figure 3:
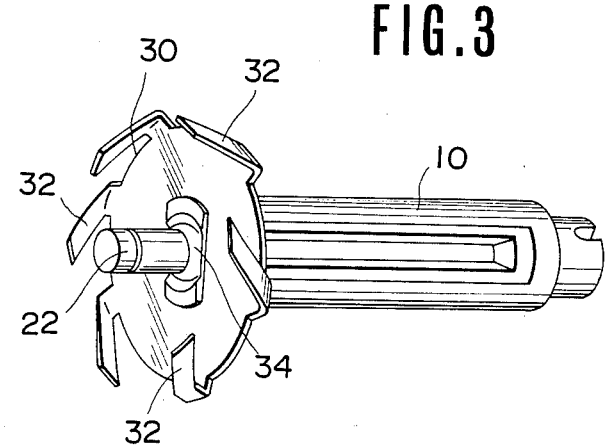
FIG. 3 is a perspective view of a locking disc in the preferred embodiment of safety belt retractor of FIG. 1.

A locking disc 30 is rigidly secured to the end 22 of the belt spool 10 for rotation therewith. A plurality of locking claws 32 project from the circumferential edge of the locking disc 30 and are arranged radially symmetrically. Each locking claw 32 lies in a cylindrical shell perpendicular to the plane of locking disc 30 but is oblique to the axis of the belt spool 10, as clearly shown in FIG. 3. A fastener 34 at the end 22 of the belt spool 10 rigidly secures the locking disc to the end of the belt spool.

The locking disk 30 secured to the end 22 of the belt spool 10 is received in a space 42 of a stationary latching drum 40. The latching drum 40 has a plurality of external tabs 44 with through openings 46 formed therein. One surface of the latching drum 40 mates with the outer surface of the side wall 16 of the retractor housing 12. A plurality of slots 50 are formed in the mating surface to allow the latching teeth 18 to extend therethrough. The latching drum 40 also has an axially extending, essentially annular wall 52. A plurality of ratchet teeth 54 are formed on the internal surface of the annular wall 52 of the latching drum 40.

The latching drum 40 also has a circular central opening 47 through which the belt spool 10 extends. The latching drum 40 is mounted on the outer surface of the side wall 16 in such a position that the through openings 46 formed in the external tabs 44 align with an equal number of openings 58 in the side wall 16. Fastener bolts 56 extend through the aligned openings 46 and 58 to fixedly secure the latching drum 40 onto the outer surface of the side wall 16.

An essentially disc-shaped leaf spring 60 is received on the outer surface of the locking disc 30 within the volume encompassed by locking claws 32. The leaf spring 60 has resilient strips 62 which extend essentially circumferentially and slightly obliquely. The resilient strips 62 are adapted to bias a toothed locking wheel 64, described below, in a direction away from the locking claws 32.

The locking wheel 64 has radially outward extending locking teeth 66 and radially inward projections 68 which project within an essentially circular central opening 69. The locking teeth 66 of the locking wheel 64 are so arranged that each pair of the locking teeth 66 are located within a space defined between adjacent locking claws 32.

Figure 6:
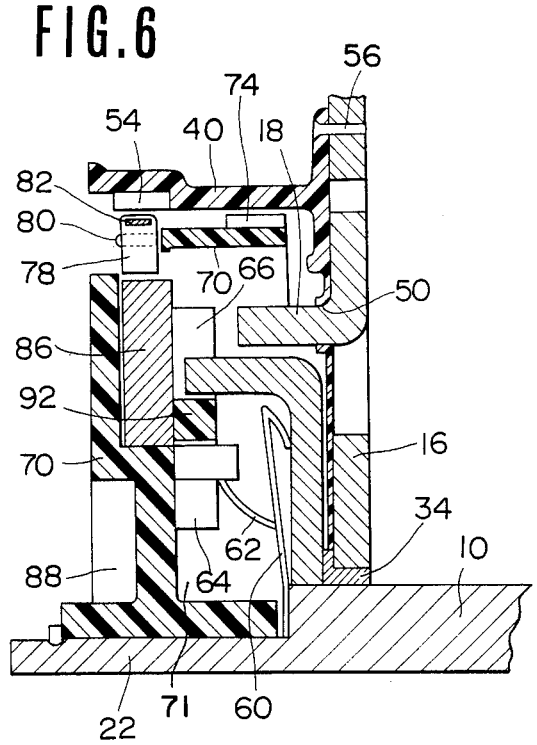
FIG. 6 is part of an axial section of major elements of the seat belt retractor as fully assembled.

The locking wheel 64 is generally received within an internal space 71 of a rotary drum 70, as shown in FIG. 6.

Figure 4:
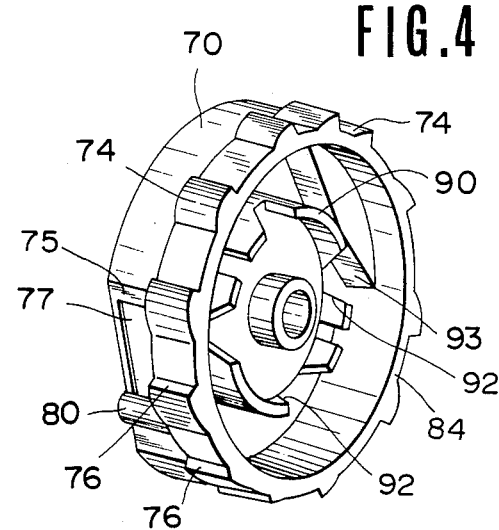
FIG. 4 is a perspective view of a rotary drum in the preferred embodiment of the safety belt retractor, showing the interior of the rotary drum and the cam surface.

As shown in FIG. 4, the rotary drum 70 also has an inner annular wall 90 which projects axially inwards through the central hole in flywheel 86. The diameter of the inner annular wall 90 is slightly smaller than that of the central opening of locking wheel 64 and so coincides with the radial position of the projections 68. Four radially symmetrically arranged notches 92 in annular wall 90 receive the projections 68 so the rotary drum 70 and the locking wheel 64 rotate together in the retraction direction. With regard to the extraction direction, one edge of each of the notches 92 is slanted at a more acute angle than the other, allowing the locking wheel 64 to rotate with respect to the rotary drum 70 in the extraction direction while moving axially away from the latter towards the belt spool 10 against the force of the resilient strips 62. In addition, the locking teeth 66 of the locking wheel 64 normally engage the portions of the locking claws 32 nearest the free ends thereof. By this engagement, the rotational moment applied to the belt spool 10 is transmitted to the locking wheel 64 via the locking claws 32. Thus, the locking wheel 64 rotates with the belt spool 10.

Figure 5:
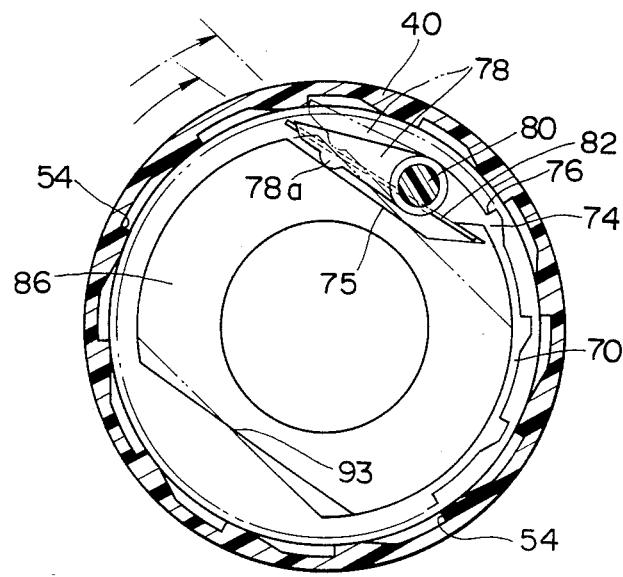
FIG. 5 is a cross-section through the assembled elements removed from the structure shown in FIG. 2, the view taken along a plane perpendicular to the axis of the belt spool.

A recess 93 in the base 73 receives the inertia responsive flywheel 86. The flywheel 86 is normally rotatable with the rotary drum 70 according to rotation of the belt spool 10, rotational force being transmitted through the locking disc 30 and the locking wheel 64. The flywheel 86 and the recess 93 both have essentially the shape of a circle truncated along two parallel chords on opposite sides of the center so as to remove about half of the circumference, as clearly shown in FIG. 5. The flattened edges of the recess 93 are actually trimmed so as to define an angle of greater than 180° at the centers of both edges, thus providing the flywheel 86 with some limited pivotal freedom. The flywheel 86 also has a large hole through its center.

The rotary drum 70 also has a plurality of ratchet projections 74 on the outer periphery of an annular wall 84. The ratchet projections 74 are arranged symmetrically about the axial half of the circumferential wall portion 84 closer to the belt spool 10. On the axially distal half of the outer periphery of the wall portion 84, a recess 75 is formed. A cylindrical pivot 80 for pivotably securing a webbing sensor pawl 78 projects axially into the recess 75. The webbing sensor pawl 78 is free to pivot about the pivot 80 and is normally biased toward its initial unlocking position shown in solid lines in FIG. 5 by means of a leaf spring 82. One end of the leaf spring 82 is anchored in a slot in one wall of recess 75. The leaf spring 82 extends from its anchor through a hole formed in the sensor pawl 78 itself inward through pivot 80. The webbing sensor pawl 78 is formed with a projection 78a opposing the flywheel 86. The recess 75 has a through opening 77 through which part of the flywheel 86 can protrude when the flywheel is displaced relative to the rotary drum within the recess 93. In such cases, the flywheel 86 displaces the webbing sensor pawl 78 to a locking position shown in phantom lines in FIG. 5 against the force of the leaf spring 82. The webbing sensor pawl 78 can engage one of the ratchet teeth 54 of the stationary latching drum 40 when displaced to this locking position. The rotary drum 70 is locked and prevented from rotating relative to the latching drum 40. When released, the leaf spring 82 returns the pawl 78 and the flywheel 86 to their original, unlatched positions.

The locking disc 30, the leaf spring 60, the locking wheel 64, the flywheel 86 and the rotary drum 70 are fitted onto the end 22 of the belt spool 10 in the order stated and retained by a snap ring or similar fastener in a carefully located groove 96. In the axial relationships specified by the axial placement of the groove 96, the locking wheel 64 is held away from the latching teeth 18 as shown in FIG. 7 and in contact with the inner annular wall 90 of rotary drum 70 by the force of the resilient strips 62. The leaf spring 60 does not move axially with respect to locking disc 30, nor does flywheel 86 separate axially from rotary drum 70. The axial relationship between these two assemblies and the locking wheel 64 is determined by the movement of locking wheel 64 along the locking claws 32 and notches 92.

A vehicle sensor 100 is also mounted on the outer surface of the side wall 16 by means of a retainer 102. The retainer 102 has a pair of recesses 106 at points corresponding to through openings 108 formed in the side wall 16. A dish-shaped weight retainer 112 has a pair of flanges 110 extending laterally therefrom. The flanges 110 each have an opening 111 aligned with one of the through openings 108 of the side wall 16. The weight retainer 112 also has a substantially horizontal flat bottom 114.

An inertia-sensitive weight 122 is received within the weight retainer 112. The inertia-sensitive weight 122 has a leg 123 to be placed on the flat bottom of the weight retainer. The inertia-sensitive weight 122 has a horizontal top face 125 with a conical recess which opposes a projection of an vehicle sensor pawl 124. The vehicle sensor pawl 124 has a pivot portion 129 with a pair of pivot pins 126. The pins 126 engage openings in a bracket 118 extending vertically from the weight retainer 112.

As is well known, the inertia-sensitive weight 122 is designed to tilt in response to excessive inertial moments and to displace the vehicle sensor pawl 124 upwards. In the displaced position, the free end of the vehicle sensor pawl 124 extends through a through opening 128 formed in the circumferential wall 48 of the stationary latching drum 40 and engages one of the ratchet projections 74 of the rotary drum 70.

In normal emergency locking operation, the inertia-sensitive weight 122 responds to an extraordinary great inertial moment due to abnormally abrupt vehicle deceleration by tilting. This inclination of the inertia-sensitive weight 122 displaces the vehicle sensor pawl 124 upwards through the opening 128. As a result, the free end of the vehicle sensor pawl 124 comes into engagement with one of the ratchet projections 74 on the outer periphery of the rotary drum 70 to lock the latter in place. In this position, the rotary drum 70 is prevented from rotating further in the extraction direction. However, the locking wheel 64 is still rotatable with the locking disc 30 in response to rotation of the belt spool 10 in the extraction direction. Since rotation of the rotary drum 70 is prevented by locking engagement between the vehicle sensor pawl 124 and the ratchet projection 74, relative displacement of the locking wheel 64 and the rotary drum 70 occurs. Due to this relative displacement, the edges 67 of the inward projections 68 follow the slanted edges of the notches 92. Thus, the locking wheel 64 moves axially inwards against the resilient force exerted by the resilient strips 62 of the leaf spring 60, while following the slope of the locking claws 32 as shown in FIGS. 8 and 9.

The locking wheel 64 thus travels toward the retractor housing and comes eventually into locking engagement between the locking teeth 66 and the edges 24 of the latching teeth 18 to lock the belt spool 10, preventing the latter from rotating. As a result, the webbing 14 can not be extracted further so that the occupant of the safety belt is restrained in the vehicle seat when the vehicle abruptly decelerates.

By helical fashion movement of the locking wheel, a shock imparted upon the locking engagement between the locking teeth 66 and the latching teeth 18 can be reduced.

When the webbing 14 is extracted abnormally abruptly, relative displacement between the flywheel 86 and the rotary drum 70 occurs. The flywheel 86 displaces the webbing sensor pawl 78 against the resilient force of the leaf spring 82. The webbing sensor pawl 78 moves into engagement with one of the ratchet projections 54. As a result, the rotary drum 70 is prevented from rotating.

After slightly more extraction of the belt, the locking teeth 66 of the locking wheel 64 come into locking engagement with the latching teeth 18 as explained above. The webbing 14 is thus prevented from being also extracted.

Lock-up may occur when the belt is fully retracted. In such cases, the sudden jerk at the end of the retraction stroke causes the flywheel 86 to be displaced relative to the rotary drum 70. Thus, the webbing sensor pawl 78 may occasionally engage the ratchet projection 54 of the latching drum 40 and after further extraction of the belt, the locking wheel 64 moves axially to engage its locking teeth 66 with the latching teeth 18.

As shown in FIG. 9, in this lock-up state, some axial clearance $S_1$ remains between the locking disc 30 and the locking wheel 64. In addition, some angular clearance $S_2$ also remains between the mating edges of the locking claw 32 and the locking teeth 66 of the locking wheel. Thus, the locking wheel 64 is free to travel further to the position shown in FIG. 10. Due to the encumbent additional axial displacement of the locking wheel, the inward projections 68 of the locking wheel 64 become free from the notches 92. Therefore, the rotary drum 70 becomes free to rotate with respect to the latching drum 40. In this case, slight retraction of the belt would allow the webbing sensor pawl 78 to return its initial unlocking position due to the resilient return force of the leaf spring 82.

The extra extraction stroke of the webbing provided by the axial clearance between the locking wheel and the locking disc as set forth above allows the webbing to be retracted slightly. Upon retraction of the belt, biasing force normally applied to the locking wheel 64 by the locking claws 32 terminates. As a result, the locking wheel 64 can be moved away from the locking disc 30 by the resilient force of the leaf spring 60, thus releasing locking engagement between the locking teeth 66 and the latching teeth 18. As a result, the safety belt retractor can be returned to its initial unlocked state.

As set forth above, according to the present invention, release from the lock-up state of the safety belt retractor can be performed easily without an excessively long webbing stroke. This enables the retractor be released from the lock-up state even after the webbing is fully retracted. After the webbing is fully retracted, webbing can always be extracted slightly to release the various latching mechanisms.

While the specific embodiment has been disclosed in order to fully disclose the present invention, the invention should not be understood or interpreted as being limited to the specific embodiment. The invention includes all possible embodiments or modifications which do not depart from the features detailed in the attached claims. For example, the vehicle sensor is not limited to the specific example given above.

We claim:

1. An emergency lock safety belt retractor comprising:

a belt spool wound therearound with a webbing;

a first locking member rotatable with said belt spool;

a second locking member normally engageable to said first locking member for rotation with said belt spool, said second locking member movable both in rotational and axial directions;

a third locking member associated with said second locking member for causing the latter to move in the axial direction, said third locking member rotatable with rotation of said belt spool in normal state;

a fourth locking member fixed to a retractor housing and having first and second locking teeth;

a first sensor detecting an inertia exceeding a given magnitude to move from normal state to a locking state, said first sensor including a first pawl engageable to said third locking member for establishing first locking engagement to restrict rotational movement of said third locking member, and causing rotational and axial movement of said second locking member toward said first locking member for establishing a second locking engagement of said second locking member with said first locking teeth of said fourth locking member for restricting rotation of said belt spool;

a second sensor detecting rotating speed of said belt spool, said second sensor incorporating a second pawl for establishing a third locking engagement between said second pawl and said second locking teeth of said fourth locking member for establishing said second locking engagement between said second locking member and said fourth locking member for restricting rotation of said belt spool; and means for allowing said belt spool to rotate in rolling out direction corresponding to a given webbing rolling out stroke after once said second locking engagement being established, in order to disengage said first and third locking engagement so as to release said second locking engagement by subsequent belt spool rotation in rolling in direction.

2. The safety belt retractor as set forth in claim 1, wherein said first locking member comprises a disc member rigidly secured onto one end of said belt spool and a plurality of claw members extending from the circumferential edge of said disc member, each of said claw extending perpendicular to the disc surface and oblique to axis of said belt spool.

3. The safety belt retractor as set forth in claim 2, wherein said second locking member comprises a plate form toothed wheel having a plurality of locking teeth normally engaging to said claw members of said first locking member so that said first locking member causes helical movement of said second locking member toward said first locking teeth of said fourth locking member for establishing said second locking engagement.

4. The safety belt retractor as set forth in claim 3, wherein said third locking member includes a cam means associated with said second locking member to actuate said second locking member in axial direction to cause said helical movement of said second locking member when one of said first and third locking engagement is established and said belt spool is actuated to rotate in rolling out direction.

5. The safety belt retractor as set forth in claim 4, wherein said toothed wheel is formed by means of press process.

6. The safety belt retractor as set forth in claim 3, wherein said plurality of locking teeth are arranged radially symmetrically about the circumference of said toothed wheel and every second locking tooth engages one of said claws.

7. The safety belt retractor as set forth in claim 6, wherein said each two of locking teeth of said toothed wheel are adapted to fall in respectively corresponding space between mutually adjacent locking teeth of said fourth locking member.

8. The safety belt retractor as set forth in claim 4, wherein said means for allowing said belt spool to rotate in rolling out direction after said second locking engagement is established, comprises a space defined between said second locking member and said fourth locking member for allowing helical movement of said second locking member, an axial distance of said helical movement of said second locking member is long enough to release said second locking member from said cam member of said third locking member for allowing the latter to rotate independently of said second locking member.

9. The safety belt retractor as set forth in claim 6, wherein said third locking member includes a cam means associated with said second locking member to actuate said second locking member in an axial direction to cause said helical movement of said second locking member when one of said first and third locking engagement is established and said belt spool is actuated to rotate in rolling out direction.

10. The safety belt retractor as set forth in claim 9, wherein said means for allowing said belt spool to rotate in rolling out direction after said second locking engagement is established, comprises a space defined between said second locking member and said fourth locking member for allowing helical movement of said second locking member, an axial distance of said helical movement of said second locking member is long enough to release said second locking member from said cam member of said third locking member for allowing the latter to rotate independently of said second locking member.

11. An emergency lock safety belt retractor for an automotive vehicle comprising:
 a belt spool received within a retractor housing and wound therearound with a webbing, said belt spool being rotatable in a first direction for rolling out said webbing from said belt spool and in a second direction for retracting said webbing to said belt spool;
 a first locking member fixedly secured to said belt spool for rotation therewith, said first locking member including a locking claw means extending orthogonal to the plane perpendicular to a longitudinal axis of said belt spool and obique to said belt spool longitudinal axis;
 a second locking member rotatable with said first locking member and movable in rotational and axial direction;
 a third locking member rotatable with said second locking member and operative between a first position in which it is rotatable with said second locking member according to rotation of said belt spool either in said first direction or in said second direction, and in a second position in which it is restricted from rotation, in said second position, said second locking member attached to said third locking member to move helically along said locking claws of said first locking member;
 a fourth locking member fixed to said retractor housing and opposing to said second locking member;
 a fifth locking member cooperatively coupled with said fourth member and having locking teeth;
 a first sensor detecting an inertia exceeding a given magnitude to move from normal state to a locking state, said first sensor including a first pawl engageable to said third locking member for establishing first locking engagement to restrict rotational movement of said third member to cause helical movement of said second locking member in response to subsequent rotation of said belt spool in said first direction toward said first locking member for establishing a second locking engagement with said fourth locking member for restricting rotation of said belt spool;
 a second sensor detecting rotating speed of said belt spool, said second sensor incorporating a second pawl for establishing a third locking engagement between said second pawl and said locking teeth of said fifth locking member to cause helical movement of said second locking member in response to subsequent rotation of said belt spool in said first direction for establishing said second locking engagement between said second locking member and said fourth locking member for restricting rotation of said belt spool; and
 means for allowing said belt spool to rotate in rolling out direction corresponding to a given webbing rolling out stroke after once said second locking engagement is established, in order to disengage said first and third locking engagement so as to release said second locking engagement by subsequent belt spool rotation in rolling in direction.

12. The safety belt retractor as set forth in claim 11, wherein said second locking member comprises a toothed wheel having a plurality of locking teeth at a given interval, which toothed wheel is formed by means of press process.

13. The safety belt retractor as set forth in claim 12, wherein said second sensor comprises an inertia responsive member detective of acceleration of said belt spool greater than a predetermined level to actuate said second pawl to establish said third locking engagement with said third locking member when the belt spool acceleration is greater than said predetermined level.

14. The safety belt retractor as set forth in claim 13, wherein said second locking pawl is normally biased by means of a resilient member toward an initial unlocking position.

15. The safety belt retractor as set forth in claim 14, wherein said means for allowing said belt spool to rotate in rolling out direction after said second locking engagement is established, comprises a space defined between said second locking member and said fourth locking member for allowing helical movement of said second locking member, an axial distance of said helical movement of said second locking member is long enough to release said second locking member from a cam member of said third locking member for allowing the latter to rotate independently of said second locking member.

16. An emergency lock safety belt retractor comprising:
 a belt spool onto which an elongate webbing is wound;

a retractor housing rotatably supporting said belt spool;
a first locking member rotatable with said belt spool;
a second locking member engaging said first locking member for rotation with said belt spool, said second locking member movable both in the rotational and axial directions of said belt spool;
a third locking member associated with said second locking member for causing the latter to move in axial direction when rotating with respect thereto, said third locking member rotatable with rotation of said belt spool when said second locking member is in a first axial range;
a fourth locking member fixed to said retractor housing;
a first sensor fixed to said retractor housing and responsive to an inertia exceeding a given magnitude for establishing a first locking engagement between said retractor housing and third member in which rotation of said third member is restricted and in which extraction of the webbing from said belt spool displaces said second locking member axially into a second axial range partially included within said first axial range in which a second locking engagement between said second locking member and said fourth locking member is established in which rotation of said belt spool in the direction of extraction of the webbing is restricted;
a second sensor responsive to abrupt angular acceleration of said belt spool in the extraction direction to establish a third locking engagement between said retractor housing and said third locking member; and
means for allowing said belt spool to rotate in the extraction direction through a predetermined, limited distance after said second locking engagement has been established to move said second locking member into a third axial range within said second axial range and outside of said first axial range, whereby said first and third locking engagements are released so that said second locking engagement can be released by subsequent belt spool rotation in the retraction direction.

17. The safety belt retractor as set forth in claim 16, wherein said first locking member comprises a disc member rigidly secured onto one end of said belt spool and a plurality of claws extending from the circumferential edge of said disc member, each of said claws extending oblique to the axis of said belt spool.

18. The safety belt retractor as set forth in claim 17, wherein said second locking member comprises a toothed wheel having a plurality of locking teeth normally engaging to said claw members of said first locking member in such a way that rotation in the extraction direction of said first locking member relative to said second locking member displaces said second locking member in a first axial direction from said first axial range toward said third axial range to lock rotation of said belt spool.

19. The safety belt retractor as set forth in claim 18, wherein said third locking member includes a cam means associated with said second locking member to actuate said second locking member in the first axial direction when one of said first and third locking engagement is established and said belt spool is rotated in the extraction direction.

20. The safety belt retractor as set forth in claim 19, wherein said toothed wheel is formed from sheet metal by press machining.

21. The safety belt retractor as set forth in claim 18, wherein said plurality of locking teeth are arranged radially symmetrically about the circumference of said toothed wheel and every second locking tooth engages one of said claws.

22. The safety belt retractor as set forth in claim 19, wherein said means for allowing said belt spool to rotate in the extraction direction after said second locking engagement is established comprises an axial clearance between said second locking member and said first locking member allowing said second locking member to move axially from said second axial range to said third axial range in response to rotation of said belt spool in the extraction direction.

23. An emergency lock safety belt retractor for an automotive vehicle comprising:
a belt spool rotatably supported by a retractor housing and onto which an elongated webbing is wound, said belt spool being rotatable in a first direction to extract said webbing from said belt spool and in a second direction to retract said webbing onto said belt spool;
a first locking member fixedly secured to said belt spool for rotation therewith, said first locking member including a locking claw means extending obliquely to the rotational axis of said belt spool;
a second locking member associated with said first locking member for rotation therewith and movable in the rotational and axial directions of said belt spool;
a third locking member associated with said second means and actuatable to one of a first position in which it is rotatable with said second locking member according to rotation of said belt spool in both of said first and second rotational directions, a second position in which it is restricted from rotation and in which it actuates said second locking member in a first axial direction in response to rotation thereof in the first rotational direction, and a third position in which said third locking member is free to rotate independently of said second locking member;
a fourth locking member fixed to said retractor housing and opposing said second locking member;
a fifth locking member cooperating with said fourth locking member and having locking teeth;
a first sensor responsive to an inertia exceeding a given magnitude to move from a normal state to a locking state, said first sensor including a first pawl engageable with said third locking member for establishing a first locking engagement in which said third locking member is actuated to its second position and in which said second locking member, in response to subsequent rotation of said belt spool in said first rotational direction, is moved in the first axial direction toward said first locking member to establish a second locking engagement with said fourth locking member in which further rotation of said belt spool in the first rotational direction is restricted;
a second sensor responsive to excessive acceleration of said belt spool in the first rotational direction to establish a third locking engagement between a second pawl incorporated therein and said locking teeth of said fifth locking member to cause axial displacement of said second locking member to establish said second locking engagement for restricting extraction of webbing from said spool;

means for allowing said belt spool to rotate in the first rotational direction through a predetermined, limited distance after said second locking engagement has been established, to actuate said third locking member to its third position to release the first and third locking engagement whereby said second locking engagement can be released by subsequent belt spool rotation in the second rotational direction.

24. The safety belt retractor as set forth in claim 23, wherein said second locking member comprises a toothed wheel having a plurality of radially symmetrically arranged locking teeth which toothed wheel is formed from sheet metal by press machining.

25. The safety belt retractor as set forth in claim 24, wherein said second sensor comprises an inertia responsive member detective of abrupt changes in the rotation speed of said belt spool in the first rotational direction to actuate said second pawl to establish said third locking engagement with said third locking member, said second pawl being mounted on said third locking member.

26. The safety belt retractor as set forth in claim 25, wherein said second pawl is normally biased by means of a resilient member toward an initial unlocking position.

27. The safety belt retractor as set forth in claim 26, wherein said means for allowing said belt spool to rotate in the first rotational direction after said second locking engagement is established comprises an axial clearance defined between said second locking member and said fifth locking member allowing movement of said second locking member in the first axial direction to a position in which said third locking member is actuated to its third position, thus allowing the latter to rotate independently of said second locking member.

* * * * *